US008281947B2

(12) United States Patent
Walkowski et al.

(10) Patent No.: US 8,281,947 B2
(45) Date of Patent: Oct. 9, 2012

(54) ANTI-SIPHON DEVICE

(75) Inventors: Paul D. Walkowski, Ann Arbor, MI (US); Vaughn K. Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 240 days.

(21) Appl. No.: 12/767,907

(22) Filed: Apr. 27, 2010

(65) Prior Publication Data

US 2010/0282757 A1    Nov. 11, 2010

Related U.S. Application Data

(60) Provisional application No. 61/177,018, filed on May 11, 2009.

(51) Int. Cl.
*B65B 3/04* (2006.01)
(52) U.S. Cl. ....................... 220/86.3; 137/588
(58) Field of Classification Search ............... 220/86.3; 137/588
See application file for complete search history.

(56) References Cited

U.S. PATENT DOCUMENTS

| 1,512,065 A | * | 10/1924 | Taylor ............... 220/86.3 |
| 1,931,335 A | * | 10/1933 | Terry ................ 220/86.3 |
| 2,372,545 A |   | 3/1945  | Breedlove |
| 2,421,350 A | * | 5/1947  | Odell ................ 220/86.3 |
| 2,496,992 A |   | 2/1950  | Glidden |
| 3,002,649 A |   | 10/1961 | Turley |
| 3,990,602 A |   | 11/1976 | Hollins |
| 4,295,577 A |   | 10/1981 | Schmid et al. |
| 4,343,410 A |   | 8/1982  | Lenda |
| 4,345,694 A |   | 8/1982  | Chambers |
| 4,630,748 A |   | 12/1986 | Keller |
| 5,025,946 A |   | 6/1991  | Butkovich et al. |
| 5,476,185 A |   | 12/1995 | Jimerson |
| 6,234,195 B1 |  | 5/2001  | Kippe et al. |
| 6,648,016 B2 |  | 11/2003 | Farrenkopf et al. |
| 6,932,100 B2 |  | 8/2005  | Martin et al. |
| 6,959,727 B2 |  | 11/2005 | Krishnamoorthy et al. |
| 7,040,360 B2 |  | 5/2006  | Watson |

(Continued)

FOREIGN PATENT DOCUMENTS

GB    1132722 A    11/1968

(Continued)

OTHER PUBLICATIONS

International Search Report for corresponding PCT Patent Application including written opinion of the searching authority. Mail date: Jan. 3, 2011.*

(Continued)

*Primary Examiner* — Stephen Castellano
(74) *Attorney, Agent, or Firm* — Quinn Law Group, PLLC

(57) ABSTRACT

A fuel storage system includes a tank, a check valve having an inlet tube, an anti-siphon device and a fuel intake tube. The anti-siphon device includes a ring defining an interior opening having a diameter. The ring abuts an upstream end of the inlet tube of the check valve, which includes an inner diameter substantially equal to the diameter of the interior opening of the ring. The ring includes and supports a plurality of fins within the inlet tube without narrowing the inlet tube to maximize fluid flow through the inlet tube. The anti-siphon device is rotatable relative to the check valve and the fuel intake tube. The shape, size and orientation of the fins are optimized to minimize flow interruption through the anti-siphon device and minimize vaporization of the fluid.

20 Claims, 3 Drawing Sheets

U.S. PATENT DOCUMENTS

| | | |
|---|---|---|
| 7,303,089 B2 | 12/2007 | Keller |
| 7,404,498 B2 * | 7/2008 | Hattori et al. ............... 220/86.3 |
| 7,458,385 B2 | 12/2008 | Martin et al. |
| 7,458,391 B2 | 12/2008 | Krishnamoorthy et al. |
| D588,055 S | 3/2009 | Moya |
| 2005/0051236 A1 | 3/2005 | Watson |
| 2006/0070667 A1 | 4/2006 | Gaynor et al. |
| 2008/0156800 A1 | 7/2008 | Mougenot |
| 2008/0257426 A1 | 10/2008 | Spink et al. |

FOREIGN PATENT DOCUMENTS

| | | |
|---|---|---|
| WO | 2006103359 A1 | 10/2006 |

OTHER PUBLICATIONS

International Search Report for corresponding PCT Patent Application including written opinion of the searching authority.

* cited by examiner

ANTI-SIPHON DEVICE

CROSS-REFERENCE TO RELATED APPLICATIONS

This application claims the benefit of U.S. Provisional Patent Application Ser. No. 61/177,018, filed on May 11, 2009, the disclosure of which is hereby incorporated by reference.

TECHNICAL FIELD

The invention generally relates to an anti-siphon device for a fuel storage system of a vehicle, and a method of assembling the fuel storage system including the anti-siphon device.

BACKGROUND

Fuel storage systems for storing a fuel for a vehicle generally include a tank, a check valve, and a fuel intake tube. The tank stores the fuel until needed by an engine. The check valve is coupled to the tank, and is configured to allow fuel flow from the fuel intake tube into the tank and prevent fuel flow in an opposite direction out of the tank and back through the fuel intake tube.

In order to prevent siphoning of the fuel stored within the tank, the fuel storage system may include an anti-siphon device. The anti-siphon device is disposed somewhere within or between the fuel intake tube and/or the check valve. The anti-siphon device prevents passage of an object, e.g., a siphon tube, therethrough, thereby preventing siphoning of the fuel stored within the tank.

Anti-siphon devices for gasoline powered vehicles have previously included a mesh screen or the like having many small sized apertures through which the fuel flows when filling the tank. For alcohol based fuels, such as E-85, the large apertures tend to vaporize a larger percentage of the alcohol based fuel during filling than occurs with gasoline. The increased vaporization of the alcohol based fuel increases the backpressure within the tank, which reduces the storage capacity of the tank, or alternatively, requires a larger carbon canister to compensate for the increased fuel vaporization.

Furthermore, fluid and/or vapor backpressure within the fuel storage system may lead to a premature shut-off condition, in which a fuel filler nozzle automatically shuts off when the back pressure rises above a certain level. The back pressure within the fuel system may be caused by flow obstructions, such as a fill pipe diameter, a sharp bend in the fill pipe, a static pressure head of the fuel in the fuel tank, a check valve in the fill pipe, etc.

SUMMARY

An anti-siphon device for a fuel storage system is provided. The anti-siphon device includes a ring concentric with a longitudinal axis and defining an interior opening. At least one fin spanning across the interior opening of the ring and having a depth extending away from the ring along the longitudinal axis. The interior opening of the ring defines a diameter. The ring abuts an end of a tube having an inner diameter substantially equal to the diameter of the interior opening of the ring, such that the ring supports the at least one fin within the tube without substantially narrowing the inner diameter of the tube, thereby minimizing a fluid pressure drop through the tube during refilling.

A fuel storage system for a vehicle is also provided. The fuel storage system includes a tank defining an inlet. A check valve is coupled to the tank and in fluid communication with the inlet of the tank. The check valve includes an inlet tube, and is configured for permitting fuel flow into the tank and preventing fluid flow from the tank. The fuel storage system further includes a fuel intake tube coupled to the check valve, and an anti-siphon device disposed between and rotatably positionable relative to the check valve and the fuel intake tube. The anti-siphon device includes a ring concentric with a longitudinal axis. The ring defines an interior opening. The anti-siphon device further includes at least one fin spanning across the interior opening of the ring and having a depth extending away from the ring along the longitudinal axis. The interior opening of the ring defines a diameter. The ring abuts an end of the inlet tube having an inner diameter substantially equal to or smaller than the diameter of the interior opening of the ring, such that the ring supports the at least one fin within the inlet tube without substantially narrowing the inner diameter of the inlet tube, thereby minimizing a fluid pressure drop through the inlet tube during refilling.

A method of assembling a fuel storage system for a vehicle is also provided. The fuel storage system includes a tank, a check valve having an inlet tube, an anti-siphon device and a fuel intake tube. The method includes coupling the check valve to the tank, positioning the anti-siphon device at an upstream end of the inlet tube of the check valve, and orienting the anti-siphon device relative to the fluid flow to maximize fluid flow through the anti-siphon device. The method further includes attaching the fuel intake tube to the check valve to secure the position of the anti-siphon device therebetween, relative to the check valve.

Accordingly, the ring of the anti-siphon device supports the fins without interfering and/or otherwise restricting with the flow of fuel through the anti-siphon device, thereby decreasing any reduction in flow caused by the anti-siphon device. Additionally, the fins are sized, spaced and oriented relative to the direction of incoming fuel flow to minimize vaporization of the fuel during filling of the tank.

The above features and advantages and other features and advantages of the present invention are readily apparent from the following detailed description of the best modes for carrying out the invention when taken in connection with the accompanying drawings.

DETAILED DESCRIPTION

Figure 1:
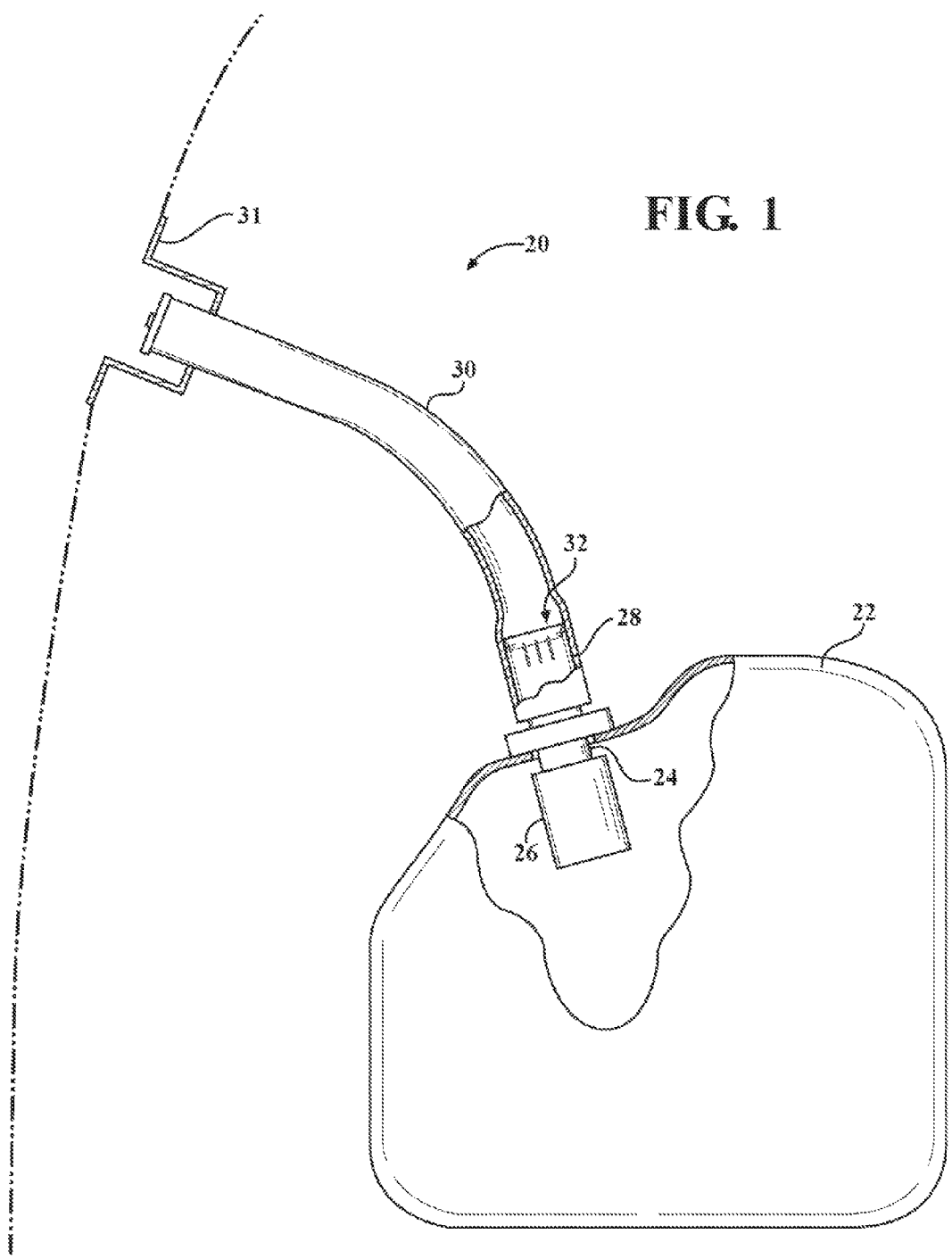
FIG. 1 is a schematic side plan view of a fuel storage system for a vehicle.

Referring to the Figures, wherein like numerals indicate corresponding parts throughout the several views, a fuel storage system is shown generally at 20 in FIG. 1. The fuel storage system 20 stores a fuel for a vehicle. The fuel may include any suitable type of fuel, such as but not limited to, an alcohol based fuel such as E-85, or gasoline. However, the fuel storage system 20 disclosed herein is particularly well suited for storing alcohol based fuels.

The fuel storage system 20 includes a tank 22. The tank 22 may be sized and/or configured in any suitable manner to meet the design considerations specific to the vehicle. Additionally, the tank 22 may be manufactured from any suitable material, including but not limited to, a metal or a plastic material. The tank 22 defines an inlet 24, through which the fuel flows to fill the tank 22. The inlet 24 may be sized and located on the tank 22 in any manner suitable to meet the specific design requirements of the vehicle. The tank 22 further includes an outlet (not shown), through which the fuel is dispensed to an engine of the vehicle.

The fuel storage system 20 further includes a check valve 26. The check valve 26 is coupled to the tank 22. As shown, the check valve 26 is directly attached to the tank 22. However, it should be appreciated that the check valve 26 may be coupled to the tank 22 by an intervening component, such as but not limited to, a hose, a connector, a tube or the like. The check valve 26 is in fluid communication with the inlet 24 of the tank 22. The check valve 26 permits fluid flow in a single direction only. It should be appreciated that as used herein, the term fluid flow includes, but is not limited to, liquid flow or vapor flow. Accordingly, the check valve 26 is configured for permitting fuel flow into the tank 22, and prevents fluid flow from exiting the tank 22 through the inlet 24 of the tank 22.

Specific to the detailed description of the invention, the check valve 26 includes an inlet tube 28 disposed at an upstream end of the check valve 26. As such, the fuel flowing into the tank 22 enters the check valve 26 at and through the inlet tube 28. Accordingly, the check valve 26 may include any check valve 26 having an inlet tube 28 disposed at the upstream end of the check valve 26 that is suitable for use in a fuel system of a vehicle, and is capable of allowing fluid flow into the tank 22 and blocking fluid flow out of the tank 22.

The fuel storage system 20 further includes a fuel intake tube 30. The fuel intake tube 30 is coupled to the check valve 26, and extends generally upward to and is coupled to a structural element 31 of the vehicle. More specifically, the fuel intake tube 30 is coupled to the inlet tube 28 of the check valve 26. The fuel intake tube 30 may be coupled to the check valve 26 in any suitable manner, including but not limited to, with a clamp or the like. As shown, the fuel intake tube 30 includes a single portion. However, it should be appreciated that the fuel intake tube 30 may include multiple portions sized and configured to fit together as required to meet the specific design constraints of the vehicle.

Referring also to FIGS. 2 through 5, the fuel storage system 20 further includes an anti-siphon device 32. The anti-siphon device 32 prevents an object from passing through the anti-siphon device 32 and into the tank 22, to prevent siphoning of the fuel stored within the tank 22. As shown, the anti-siphon device 32 is disposed between the check valve 26 and the fuel intake tube 30. Alternatively, if the fuel intake tube 30 includes multiple sections, then the anti-siphon device 32 may be disposed between two adjoining portions of the fuel intake tube 30.

Figure 4:
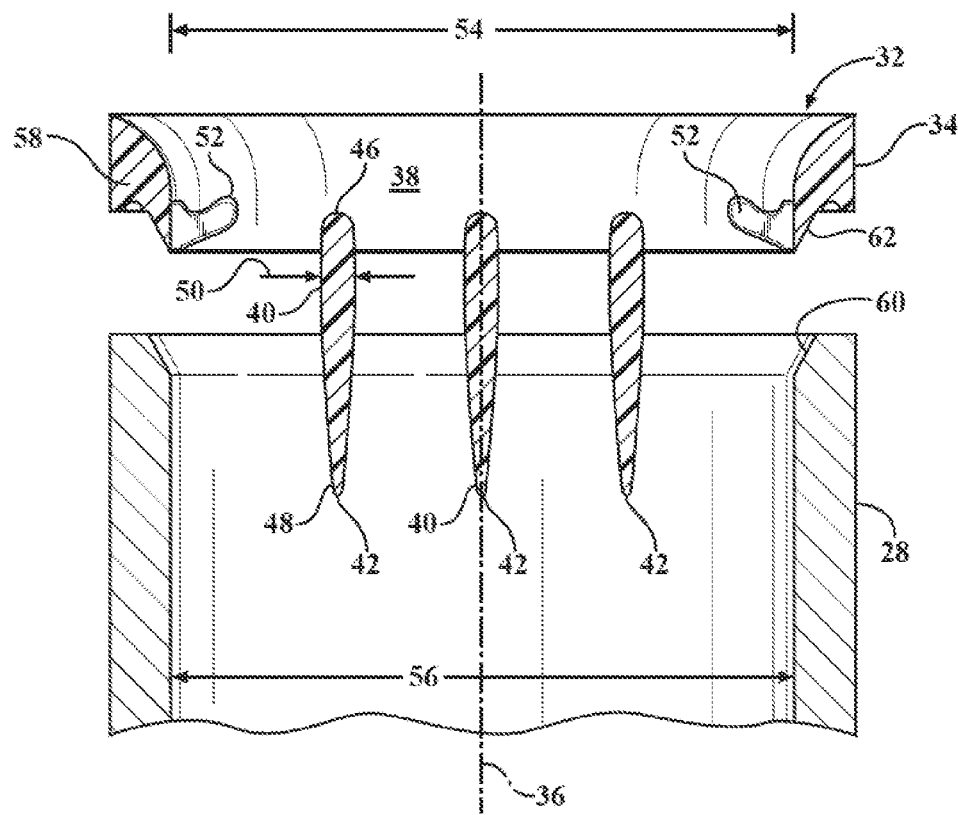
FIG. 4 is an exploded partial schematic cross sectional view of the fuel storage system showing the anti-siphon device.
Figure 5:
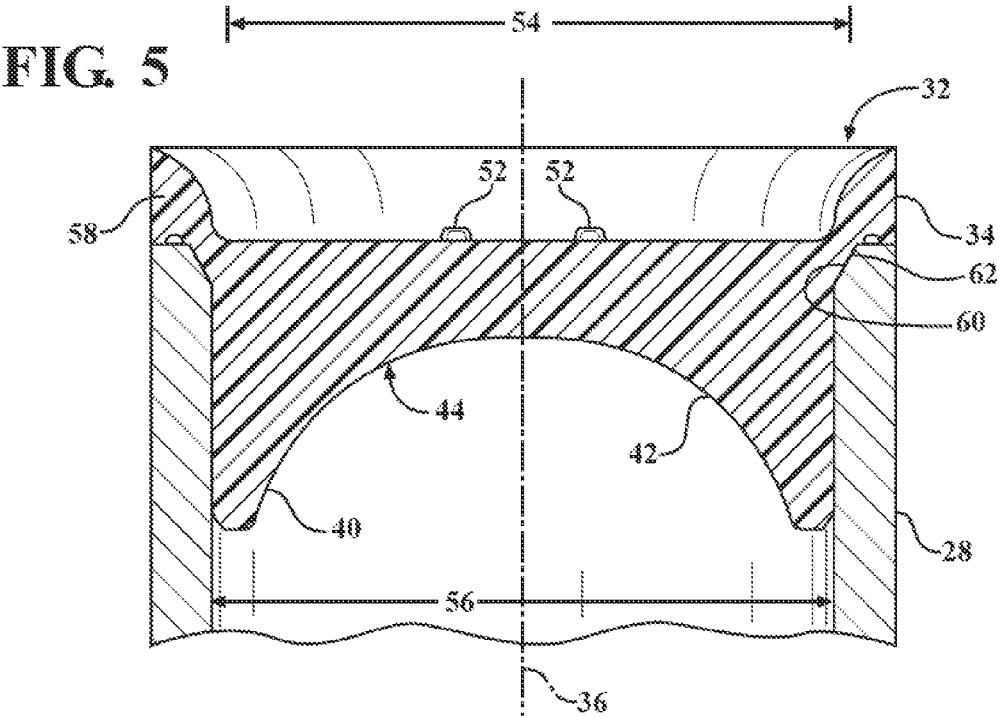
FIG. 5 is a partial schematic cross sectional view of the fuel storage system, perpendicular to the view shown in FIG. 4, showing the anti-siphon device.

The anti-siphon device 32 includes a ring 34, which is concentric with a longitudinal axis 36. As shown, the ring 34 includes an annular shape, and defines an interior opening 38 defining an annular shape as well. However, the ring 34 and the interior opening 38 may be shaped other than shown and described herein. As shown in FIGS. 4 and 5, the ring 34 and the interior opening 38 are shaped to match the shape of the intake tube of the check valve 26 and/or the fuel intake tube 30.

The anti-siphon device 32 includes at least one fin 40. The number of fins 40 should be as few a possible to minimize fluid pressure drop , yet still sufficient in number to block passage of an object of a pre-determined size, including but not limited to an object having an outside diameter of 5.2 mm or larger. As shown, the at least one fin 40 includes a plurality of fins 40. More specifically, the plurality of fins 40 includes three fins 40. However, the number of fins 40 depends upon the size of the ring 34 and the size of the object that the anti-siphon device 32 must block. Accordingly, the number of fins 40 may be greater than or less than the three fins 40 shown in the drawings. As shown, the fins 40 span across the interior opening 38 of the ring 34 in parallel relationship with each other, and extend along the longitudinal axis 36. However, it should be appreciated that the fins 40 may be configured in any other manner that minimizes obstruction to a cross sectional flow area.

Figure 2:
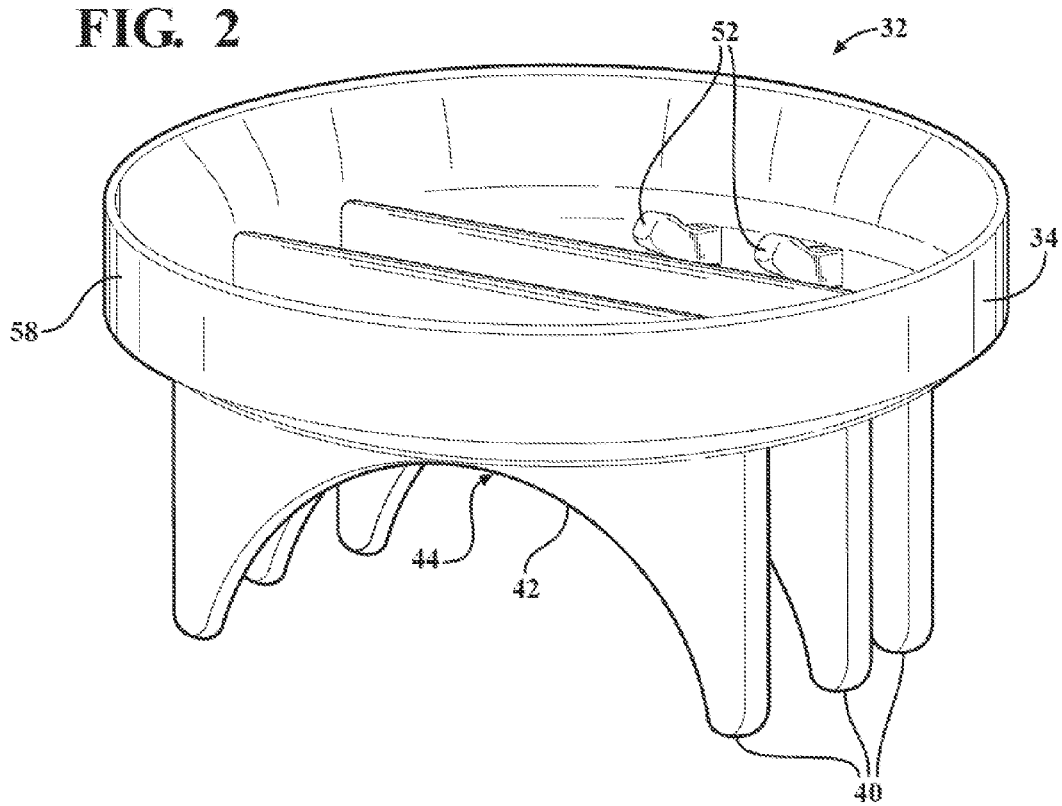
FIG. 2 is a schematic perspective view of an anti-siphon device of the fuel storage system.

The fins 40 extend from the ring 34 to a distal edge 42. As shown in FIGS. 2 and 5, the distal edge 42 of each of the fins 40 defines a semi-circular cut-out 44 that is perpendicular to the longitudinal axis 36. The semi-circular cut-out 44 defines the depth of the fin 40 from the ring 34 along the longitudinal axis 36. The fin 40 depth is shallowest at the center of a flow path defined by the inlet tube 28 or the fuel intake tube 30, where the fluid flow rate is higher. The fin 40 depth is deepest near the periphery of the fluid flow path, i.e., adjacent the walls of the inlet tube 28 and/or the fuel intake tube 30, where the fluid flow rate is lower. By reducing the fin 40 depth where the fluid flow rate is higher, and increasing the fin 40 depth where the fluid flow rate is lower, the fins 40 minimize turbulence in the fluid passing through the anti-siphon device 32, thereby decreasing the fluid pressure drop and minimizing any vaporization of the fluid passing through the anti-siphon device 32.

Referring to FIG. 4, the fins 40 may have an airfoil-shaped cross section taken perpendicular to the longitudinal axis 36, and perpendicular to the semi-circular cut-out 44. More specifically, the airfoil shape of the fins 40 includes a first edge 46, a second edge 48 and a middle section 50. The middle section 50 is disposed between the first edge 46 and the second edge 48. The first edge 46 and the second edge 48 may include a thickness between the range of 0.5 mm and 1.0 mm. The middle section 50 may include a thickness between the range of 0.75 mm and 1.5 mm. Accordingly, the thickness of the fins 40 increases toward the midsection of the fins 40. The airfoil shape of the fins 40 minimizes turbulence in the fluid passing through the anti-siphon device 32, thereby decreasing the pressure drop and minimizing any vaporization of the fluid passing through the anti-siphon device 32.

Figure 3:
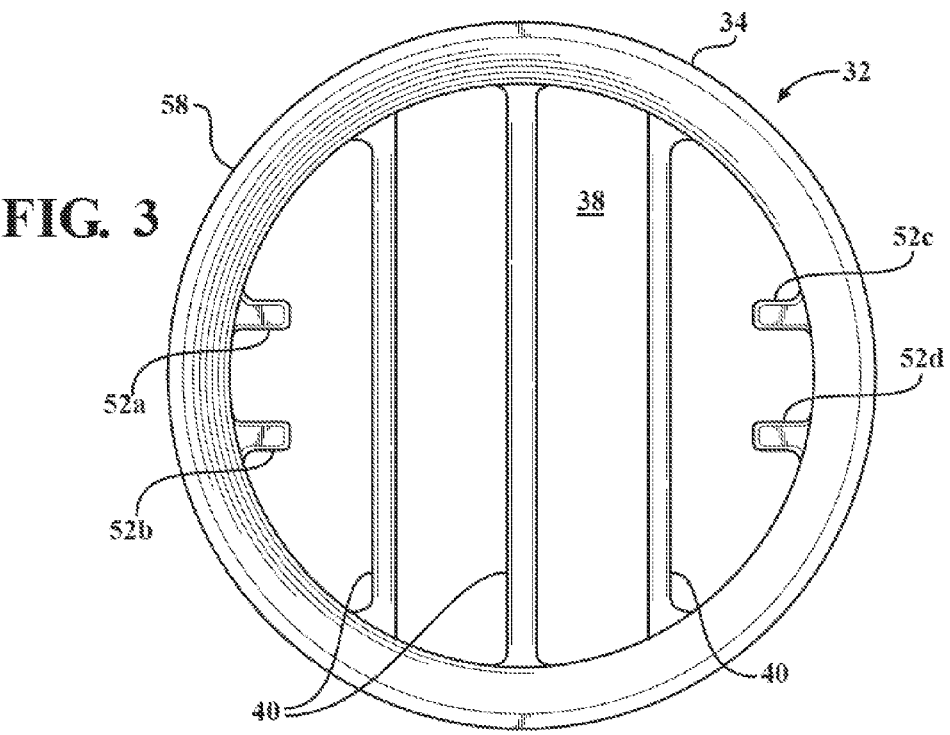
FIG. 3 is a schematic top plan view of the anti-siphon device.

Referring to FIGS. 2 through 5, the anti-siphon device 32 may include at least one projection 52 extending radially inward toward the longitudinal axis 36, and perpendicular to the fins 40. As shown in FIG. 3, the at least one projection 52 may include a first projection 52a, a second projection 52b, a third projection 52c and a fourth projection 52d. However, the specific number of projections 52 depends upon the size of the ring 34 and the size of the object that the anti-siphon device 32 must block. Accordingly, the number of projections 52 may vary from that shown and described herein. In this embodiment, the first projection 52a, the second projection 52b, the third projection 52c and the fourth projection 52d each extend inwardly from the ring 34, into the interior opening 38 of the ring 34 and perpendicularly relative to the fins 40. The first projection 52a and the second projection 52b are disposed on opposite sides of the fins 40 relative to the third projection 52c and the fourth projection 52d. The fins 40 and the projections 52 cooperate to prevent passage of an object, such as a siphon hose, through the anti-siphon device 32. As such, the projections reduce obstruction of the cross sectional fluid flow area to minimize drag and/or fluid pressure drop while still preventing passage of the object. As shown, the three fins 40, the first projection 52a, the second projection 52b, the third projection 52c and the fourth projection 52d cooperate to prevent an object having an outer diameter of at least 5.0 mm from passing through the interior opening 38 of the ring 34. However, as described above, the fins 40 and the projections 52 may be configured other than shown and described herein to block an object of a different size. However, the number of fins 40 and the number of projections 52 should be configured for a given application to minimize restriction of the fluid flow path of the inlet tube 28 and/or the fuel intake tube 30 and not impede fluid flow into the tank 22, thereby minimizing vaporization of the fluid passing through the anti-siphon device 32. In other words, the number of fins 40 and the number of projections 52 may be minimized for a given application.

Referring to FIGS. 4 and 5, the interior opening 38 of the ring 34 is sized to match the fluid flow path defined by the inlet tube 28 and/or the fuel intake tube 30. As shown, the interior opening 38 of the ring 34 defines a diameter 54 that is substantially equal to or larger than a diameter 56 of the inlet tube 28 and/or the fuel intake tube 30. A body 58 of the ring 34 extends radially outward from the longitudinal axis 36, away from the interior opening 38 and the fluid flow path defined by the inlet tube 28 and/or the fuel intake tube 30, such that the body 58 of the ring 34 does not interfere with fluid flow through the inlet tube 28 and/or the fuel intake tube 30. As shown, the ring 34 is configured for abutting an end of a tube. More specifically, the ring abuts the inlet tube 28. However, as described above, the fuel storage system 20 may be configured such that the ring abuts an end of the fuel intake tube 30. The inlet tube 28 includes an inner diameter 56 substantially equal to or smaller than the diameter 54 of the interior opening 38 of the ring 34 such that the ring 34 supports the plurality of fins 40 within the inlet tube 28 without narrowing the inner diameter 56 of the inlet tube 28, maximizing fluid flow through the inlet tube 28. Therefore, only the fins 40, the first projection 52a, the second projection 52b, the third projection 52c and the fourth projection 52d extend into the interior opening 38, and are disposed within the fluid flow path defined by the inlet tube 28, with the ring 34 being disposed outside the fluid flow path. Accordingly, the ring 34 does not impede the fluid flow through the fluid flow path, thereby minimizing vaporization of the fluid flowing through the anti-siphon device 32.

The upstream end of the inlet tube 28 of the check valve 26 includes a chamfered edge 60. The ring 34 includes a chamfered edge 62 on a downstream edge, which abuts the chamfered edge 60 of the inlet tube 28. The mating chamfered edges 60, 62 cooperate to position the anti-siphon device 32 relative to the check valve 26, and perpendicular to the longitudinal axis 36. It should be appreciated that if the anti-siphon device 32 is disposed between different portions of the fuel intake tube 30, then an upstream edge of one of the portions of the fuel intake tube 30 would define 40 the chamfered edge 60 for the chamfered edge 62 of the ring 34 to mate against.

Assuming the anti-siphon device 32 is circularly shaped, as shown and described herein, the anti-siphon device 32 is rotatably positionable relative to the check valve 26 and the fuel intake tube 30. In other words, the anti-siphon device 32 is separate from the check valve 26 and the fuel intake tube 30, and may be rotated about the longitudinal axis 36 to position the anti-siphon device 32 relative to the check valve 26 and the fuel intake tube 30. By rotating the anti-siphon device 32, the fins 40 may be aligned with a fluid flow direction that minimizes obstructions in the fluid flow path. For example, if the fuel intake tube 30 has a bend immediately upstream from the anti-siphon device 32, the anti-siphon device 32 may be rotated so that the fluid does not impinge upon the fins 40 and that the fins 40 align with the plane of curvature. This alignment minimizes the fluid pressure drop as the fuel follows the bend, thereby reducing potential vaporization of the fluid.

As described herein, the anti-siphon device 32 is configured to minimize vaporization and minimize fluid pressure drop through the anti-siphon device 32. In so doing, the anti-siphon device 32 of the present invention is particularly useful when used with an alcohol based fuel, such as E-85, which vaporizes much more easily than gasoline and can generate excessive backpressure during refilling, triggering premature nozzle shutoff. Backpressure within the fuel storage system 20 is reduced by minimizing the vaporization, and maximizing the fluid flow rate through the anti-siphon device 32. Accordingly, by minimizing the backpressure within the fuel storage system 20, the fuel storage system 20 may operate properly regardless of fuel type. Additionally, excessive vaporization of the fuel flowing through the anti-siphon device 32 may decrease the storage capacity of the tank 22. By decreasing the vaporization of the fuel, particularly for alcohol based fuels, the anti-siphon device 32 maximizes the storage capacity of a canister system.

Referring back to FIG. 1, a method of assembling the fuel storage system 20 described above is provided. The method includes coupling the check valve 26 to the tank 22. As described above, the check valve 26 may be coupled directly or indirectly to the tank 22 in any suitable manner, including but not limited to, clamping.

The method further includes positioning the anti-siphon device 32 within the fluid flow path. The anti-siphon device 32 may be positioned at an upstream end of the inlet tube 28 of the check valve 26. Alternatively, the anti-siphon device 32 may be positioned between adjoining portions of the fuel intake tube 30.

The method further includes orienting the anti-siphon device 32 relative to the fluid flow to increase fluid flow through the anti-siphon device 32. More specifically, orienting the anti-siphon device 32 relative to the fluid flow includes rotating the anti-siphon device 32 until the plurality of fins 40 are arranged in an orientation that reduces impingement of the fluid on the fins 40.

The method further includes securing the position of the anti-siphon device 32. The position of the anti-siphon device 32 may be secured by attaching the fuel intake tube 30 to the check valve 26 to secure the position of the anti-siphon device 32, relative to the check valve 26. The fuel intake tube 30 may be attached to the inlet tube 28 of the check valve 26 in any suitable manner, including but not limited to, clamping or other similar method. Alternatively, if the anti-siphon device is disposed between adjoining portions of the fuel intake tube 30, the anti-siphon device 32 may be secured by attaching the adjoining portions of the fuel intake tube 30.

Positioning the anti-siphon device 32 adjacent to and in abutting engagement with the inlet tube 28 of the check valve 26, with the check valve 26 directly attached to the tank 22, as is shown in FIG. 1, provides for convenient disassembly and emptying of the tank 22. When so constructed, the fuel intake tube 30 may be disconnected from the inlet tube 28 of the check valve 26 and the anti-siphon device 32. After the anti-siphon device 32 is removed, a siphon tube may then be inserted into the tank 22 to drain the tank 22.

While the best modes for carrying out the invention have been described in detail, those familiar with the art to which this invention relates will recognize various alternative designs and embodiments for practicing the invention within the scope of the appended claims.

The invention claimed is:

1. An anti-siphon device for a fuel storage system, the anti-siphon device comprising:
   a ring concentric with a longitudinal axis and defining an interior opening;
   at least one fin spanning across the interior opening of the ring and having a depth extending away from the ring along the longitudinal axis; and
   at least one projection extending inward from the ring into the interior opening of the ring;
   wherein the interior opening of the ring defines a diameter and wherein the ring abuts an end of a tube having an inner diameter substantially equal to the diameter of the interior opening of the ring such that the ring supports the at least one fin within the tube without substantially narrowing the inner diameter of the tube, thereby minimizing a fluid pressure drop through the tube during refilling; and
   wherein the at least one fin and the at least one projection cooperate to prevent passage of an object having an outer diameter of at least 5.0 mm from passing through the interior opening of the ring.

2. An anti-siphon device as set forth in claim 1 wherein the at least one fin extends from the ring to a distal edge, wherein the distal edge defines a semi-circular cut-out when viewed in a direction perpendicular to the longitudinal axis.

3. An anti-siphon device as set forth in claim 2 wherein the at least one fin includes a cross section defining an airfoil shape when viewed in a direction perpendicular to the longitudinal axis and perpendicular to the semi-circular cut-out.

4. An anti-siphon device as set forth in claim 3 wherein the airfoil shape of the at least one fin includes a first edge, a second edge, and a middle section disposed between the first edge and the second edge, wherein the first edge and the second edge include a thickness between the range of 0.5 mm and 1.0 mm, and the middle section includes a thickness between the range of 0.75 mm and 1.5 mm.

5. An anti-siphon device as set forth in claim 1 wherein the at least one projection includes four projections, wherein a first projection and a second projection are disposed on opposite sides of the at least one fin relative to a third projection and a fourth projection.

6. An anti-siphon device as set forth in claim 1 wherein only the at least one projection and the at least one fin are disposed within a fluid flow path defined by the tube, with the ring disposed outside the fluid flow path defined by the tube.

7. An anti-siphon device for a fuel storage system, the anti-siphon device comprising:
   a ring concentric with a longitudinal axis and defining an interior opening; and
   at least one fin spanning across the interior opening of the ring and having a depth extending away from the ring along the longitudinal axis;
   wherein the interior opening of the ring defines a diameter and wherein the ring abuts an end of a tube having an inner diameter substantially equal to the diameter of the interior opening of the ring such that the ring supports the at least one fin within the tube without substantially narrowing the inner diameter of the tube, thereby minimizing a fluid pressure drop through the tube during refilling;
   wherein the at least one fin extends from the ring to a distal edge, wherein the distal edge defines a semi-circular cut-out when viewed in a direction perpendicular to the longitudinal axis;
   wherein the at least one fin includes a cross section defining an airfoil shape when viewed in a direction perpendicular to the longitudinal axis and perpendicular to the semi-circular cut-out; and
   wherein the airfoil shape of the at least one fin includes a first edge, a second edge, and a middle section disposed between the first edge and the second edge, wherein the first edge and the second edge include a thickness between the range of 0.5 mm and 1.0 mm, and the middle section includes a thickness between the range of 0.75 mm and 1.5 mm.

8. An anti-siphon device as set forth in claim 7 wherein the at least one fin includes three fins arranged in parallel.

9. An anti-siphon device as set forth in claim 7 wherein the at least one fin and the at least one projection cooperate to prevent passage of an object having an outer diameter of at least 5.0 mm from passing through the interior opening of the ring.

10. A fuel storage system for a vehicle, the fuel storage system comprising:
    a tank defining an inlet;
    a check valve coupled to the tank and in fluid communication with the inlet of the tank and including an inlet tube, the check valve configured for permitting fuel flow into the tank and preventing fluid flow from the tank;
    a fuel intake tube coupled to the check valve; and
    an anti-siphon device disposed between and rotatably positionable relative to the check valve and the fuel intake tube, the anti-siphon device including:
      a ring concentric with a longitudinal axis and defining an interior opening;
      at least one fin spanning across the interior opening of the ring and having a depth extending away from the ring along the longitudinal axis; and
      at least one projection extending inward from the ring into the interior opening of the ring;
      wherein the interior opening of the ring defines a diameter and wherein the ring abuts an end of the inlet tube having an inner diameter substantially equal to or smaller than the diameter of the interior opening of the ring such that the ring supports the at least one fin within the inlet tube without substantially narrowing the inner diameter of the inlet tube, thereby minimizing a fluid pressure drop through the inlet tube during refilling; and
      wherein the at least one fin and the at least one projection cooperate to prevent passage of an object having an outer diameter of at least 5.0 mm from passing through the interior opening of the ring.

11. A fuel storage system as set forth in claim 10 wherein the at least one fin extends from the ring to a distal edge, wherein the distal edge defines a semi-circular cut-out when viewed in a direction perpendicular to the longitudinal axis.

12. A fuel storage system as set forth in claim 10 wherein the at least one fin includes a cross sectional shape when viewed in a direction perpendicular to the longitudinal axis and perpendicular to the semi-circular cut-out defining an airfoil shape.

13. A fuel storage system as set forth in claim 12 wherein the airfoil shape of the at least one fin includes a first edge, a second edge, and a middle section disposed between the first edge and the second edge, wherein the first edge and the second edge include a thickness between the range of 0.5 mm and 1.0 mm, and the middle section includes a thickness between the range of 0.75 mm and 1.5 mm.

14. A fuel storage system as set forth in claim 10 wherein the inlet tube of the check valve includes an upstream end defining a chamfered edge, and wherein the ring includes a chamfered edge in abutting engagement with the chamfered edge of the inlet tube and cooperating with the chamfered edge of the inlet tube to position the anti-siphon device relative to the check valve, perpendicular to the longitudinal axis.

15. A fuel storage system as set forth in claim 10 wherein only the at least one projection and the at least one fin are disposed within a fluid flow path defined by the tube, with the ring disposed outside the fluid flow path defined by the tube.

16. A fuel storage system for a vehicle, the fuel storage system comprising:
   a tank defining an inlet
   a check valve coupled to the tank and in fluid communication with the inlet of the tank and including an inlet tube, the check valve configured for permitting fuel flow into the tank and preventing fluid flow from the tank;
   a fuel intake tube coupled to the check valve; and
   an anti-siphon device disposed between and rotatably positionable relative to the check valve and the fuel intake tube, the anti-siphon device including:
      a ring concentric with a longitudinal axis and defining an interior opening; and
      at least one fin spanning across the interior opening of the ring and having a depth extending away from the ring along the longitudinal axis;
   wherein the interior opening of the ring defines a diameter and wherein the ring abuts an end of the inlet tube having an inner diameter substantially equal to or smaller than the diameter of the interior opening of the ring such that the ring supports the at least one fin within the inlet tube without substantially narrowing the inner diameter of the inlet tube, thereby minimizing a fluid pressure drop through the inlet tube during refilling; and
   wherein the airfoil shape of the at least one fin includes a first edge, a second edge, and a middle section disposed between the first edge and the second edge, wherein the first edge and the second edge include a thickness between the range of 0.5 mm and 1.0 mm, and the middle section includes a thickness between the range of 0.75 mm and 1.5 mm.

17. A fuel storage system as set forth in claim 16 wherein the at least one fin includes three fins arranged in parallel.

18. A fuel storage system as set forth in claim 17 further including a first projection, a second projection, a third projection and a fourth projection extending inward from the ring into the interior opening of the ring, perpendicular relative to the at least one fin, wherein the first projection and the second projection are disposed on opposite sides of the at least one fin relative to the third projection and the fourth projection.

19. A fuel storage system as set forth in claim 18 wherein the at least one fin, the first projection, the second projection, the third projection and the fourth projection cooperate to prevent passage of an object having an outer diameter of at least 5.0 mm from passing through the interior opening of the ring.

20. A fuel storage system as set forth in claim 18 wherein only the at least one fin, the first projection, the second projection, the third projection and the fourth projection are disposed within a fluid flow path defined by the inlet tube, with the ring disposed outside the fluid flow path defined by the inlet tube.

* * * * *